(12) United States Patent
Peck

(10) Patent No.: US 8,954,809 B2
(45) Date of Patent: Feb. 10, 2015

(54) METHOD FOR GENERATING DESCRIPTIVE TRACE GAPS

(75) Inventor: Jason L. Peck, Houston, TX (US)

(73) Assignee: Texas Instruments Incorporated, Dallas, TX (US)

( * ) Notice: Subject to any disclaimer, the term of this patent is extended or adjusted under 35 U.S.C. 154(b) by 166 days.

(21) Appl. No.: 13/557,339

(22) Filed: Jul. 25, 2012

(65) Prior Publication Data

US 2014/0032974 A1     Jan. 30, 2014

(51) Int. Cl.
     *G06F 11/00*          (2006.01)

(52) U.S. Cl.
     USPC ........................................................ 714/45

(58) Field of Classification Search
     CPC ..... G06F 17/505; G06F 17/5054; G06F 1/06; G06F 1/08; G06F 1/10; G06F 1/266; G06F 1/3237; G06F 21/445; G06F 21/57; G06F 21/606; G06F 21/608; G06F 21/72; G06F 21/79; G06F 2205/102; G06F 5/14
     USPC ........................................................ 714/45
     See application file for complete search history.

(56) References Cited

U.S. PATENT DOCUMENTS

| | | | | |
|---|---|---|---|---|
| 5,832,308 | A * | 11/1998 | Nakamura et al. | 710/53 |
| 5,860,119 | A * | 1/1999 | Dockser | 711/156 |
| 5,991,304 | A * | 11/1999 | Abramson | 370/413 |
| 6,209,065 | B1 * | 3/2001 | Van Doren et al. | 711/150 |
| 6,571,301 | B1 * | 5/2003 | Nakahara | 710/31 |
| 7,093,236 | B2 * | 8/2006 | Swaine et al. | 717/128 |
| 7,278,073 | B2 * | 10/2007 | Kimelman et al. | 714/724 |
| 7,802,149 | B2 * | 9/2010 | Cruickshank et al. | 714/45 |
| 8,042,007 | B1 * | 10/2011 | Chan et al. | 714/45 |
| 8,392,799 | B1 * | 3/2013 | Sutardja et al. | 714/763 |
| 2005/0165597 | A1 * | 7/2005 | Nightingale | 703/27 |
| 2006/0259827 | A1 * | 11/2006 | Sohm et al. | 714/38 |
| 2006/0259831 | A1 * | 11/2006 | Sohm et al. | 714/45 |
| 2007/0132883 | A1 * | 6/2007 | Hattori et al. | 348/468 |
| 2007/0237074 | A1 * | 10/2007 | Curry | 370/229 |
| 2007/0268905 | A1 * | 11/2007 | Baker et al. | 370/392 |
| 2008/0112012 | A1 * | 5/2008 | Yokoyama et al. | 358/3.03 |
| 2009/0086628 | A1 * | 4/2009 | Gracon et al. | 370/230 |
| 2010/0257510 | A1 * | 10/2010 | Horley et al. | 717/128 |
| 2012/0110387 | A1 * | 5/2012 | Horley et al. | 714/45 |
| 2012/0226839 | A1 * | 9/2012 | Fuoco et al. | 710/110 |
| 2013/0246676 | A1 * | 9/2013 | Hesse | 710/110 |
| 2014/0095940 | A1 * | 4/2014 | Peck | 714/45 |

* cited by examiner

*Primary Examiner* — Amine Riad
(74) *Attorney, Agent, or Firm* — Robert D. Marshall, Jr.; Frederick J. Telecky, Jr.

(57) ABSTRACT

A method of managing a debug trace data stream by detecting conditions where the trace data generated exceeds the available transmission bandwidth, and inserting a trace data gap into the trace data stream. The gap may contain additional information relating to the amount and type of data that is being lost during the overflow condition. In an alternate embodiment the generated trace may be throttled to ensure the available bandwidth is not exceeded.

9 Claims, 1 Drawing Sheet

METHOD FOR GENERATING DESCRIPTIVE TRACE GAPS

TECHNICAL FIELD OF THE INVENTION

The technical field of this invention is debug trace generation.

BACKGROUND OF THE INVENTION

Debugging of embedded solutions has always been a difficult job. As processors become faster and more complex, debugging and development with the current debug technology becomes more difficult. In order to address these complex issues, greater visibility into the program operation is needed. Three areas in which greater visibility is desired are program counter tracing, cycle accurate profiling, and load and store data logging. Access to this data may be available through a dedicated Debug Port. However, each of these problems demands a tremendous amount of information. Simply supplying a large number of high frequency pins to view all of this data is neither practical nor cost effective, and an encoding scheme is needed to further compress all of this data. An encoding has been used that encodes Program Counter (PC) tracing, cycle accurate timing of all instructions, and load and store data logging. All of this data can be transmitted across the same pins on the Debug Port.

The debug port is a tool that provides for the export of software or hardware generated trace information to an external recorder. The trace port utilizes a transmission format that addresses the requirements without noticeably compromising the format efficiency for any given implementation. The format primitives are viewed as a trace export instruction set. All processors use this instruction set to describe the system activity within a device. Each processor can describe the system activity in any manner that uses the instruction set and the rule set governing its use.

It is important to note that the external transmission rates/pins are fixed by the deployed receiver technology. These rates will remain relatively constant over time. This implies that as CPU clock rates increase, there will be increasing pressure to optimize the format to get the most compressed representation of system activity. This will be necessary just to maintain the status quo. Fortunately, the transmission format used provides an efficient means to represent the system activity. However, this efficiency comes at the expense of a larger on-chip hardware expenditure in order to gain the compression efficiency. This gives the processors the capability to improve the efficiency of their export bandwidth as it is stressed by CPU clock rate increases. The steady march to faster CPU clock rates and denser manufacturing processes will necessitate taking advantage of all compression opportunities and the best available physical transmission technology.

The format is designed to provide designers the ability to:

Optimize bandwidth utilization (most real information sent in minimum bits/second)

Chose less efficient but more cost effective representations of system activity

Mix of both of the above approaches (i.e. optimize PC trace transmission efficiency while implementing less efficient memory access export)

This gives different processors the ability to represent their system activity in forms most suitable to their architecture.

Tradeoffs has to be made since there are numerous cost/capability/bandwidth configuration requirements. Adjustments can be made to optimize and improve the format over time.

The transmission format remains constant over all processors while the nature of the physical transmission layer can be altered. These alterations can take three forms:

Transmission type (differential serial or conventional single ended I/O)

Number of pins allocated to the transmission

Frequency of the data transmission

This means that the format representing the system activity can and is viewed as data by the actual physical mechanism to be transmitted. The collection and formatting sections of the debug port should be implemented without regard to the physical transmission layer. This allows the physical layer to be optimized to the available pins and transmission bandwidth type without changing the underlying physical implementation. The receiver components are designed to be both physical layer and format independent. This allows the entire transmit portion to evolve over time.

A 10-bit encoding is used to represent the PC trace, data log, and timing information. The trace format width has been decoupled from number of transmission pins. This format can be used with any number of transmission pins. The PC trace, Memory Reference information, and the timing information are transmitted across the same pins.

Packets can contain opcodes or data, or both. A code packet contains an opcode that indicates the type of information being sent. The opcode can be 2 to 10 bits long. The remainder of the code packet will hold data associated with that opcode.

In many cases, additional data needs to be associated with an opcode. This data is encoded in subsequent packets referred to as data packets. Data packets contain information that should be associated with the previous opcode.

A sequence of packets that begins with code packet and includes all of the data packets that immediately follow the code packet is referred to as a command. A command can have zero or more parameters. Each parameter is an independent piece of data associated with the opcode in the command. The number of parameters expected depends on the opcode. The first parameter of a command is simply encoded using data packets following a code packet. The first data packet of subsequent parameters is marked with the 10 opcode.

The interpretation of a command is dependent on two factors, the opcode of the command, and the number of parameters included in the command. In other words, a code packet has one meaning if it is immediately followed by another code packet, but the same packet can take on an entirely different meaning if it is succeeded with data packets. Trace opcodes are shown in Table 1.

TABLE 1

| | |
|---|---|
| 00000 0000 | No Information/End of Buffer |
| 000000 0001 | Start Repeat Single |
| 000000 0010 | PC Trace Gap |
| 000000 0011 | Register Repeat |
| 000000 0100 | NOP SP loop |
| 000000 0101 | SPLOOP marker |
| 000000 0110 | Timing Trace Gap |
| 000000 0111 | Command Escape |
| 000000 1000 | Exception Occurred |
| 000000 1001 | Exception Occurred with Repeat Single |
| 000000 1010 | Block Repeat 0 |
| 000000 1011 | Block Repeat 0 with Repeat Single |
| 000000 1100 | Block Repeat 1 |
| 000000 1101 | Block Repeat 1 with Repeat Single |

TABLE 1-continued

| | |
|---|---|
| 000000 1110 | Memory Reference Trace Gap |
| 000000 1111 | Periodic Data Sync Point |
| 000001 0xxx | Timing Sync Point |
| 000001 1xxx | Memory Reference Sync Point |
| 000010 xxxx | PC Sync Point/First/Last/ |
| 000011 000x | PC Event Collision |
| 000011 001x | Reserved |
| 000011 01xx | Reserved |
| 000011 1xxx | Reserved |
| 00010x xxxx | Extended Timing Data |
| 00011x xxxx | CPU and ASIC Data |
| 0010xx xxxx | Reserved |
| 001100 0000 | Memory Reference Trace Gap (legacy |
| 001100 0001 | Periodic Data Sync Point (legacy |
| 0011xx xxxx | Memory Reference Block |
| 01xxxx xxxx | Relative Branch Command/Register Branch |
| 10xxxx xxxx | Continue |
| 11xxxx xxxx | Timing |

The timing trace gap code indicates that some timing trace information is missing at this point. The timing trace remains invalid until the Synchronization code is found in the trace stream. The timing trace gap code can be issued at any point.

It is permissible to have timing syncs included in a gap thus introducing a discontinuity in the timing sync ID sequence.

Issuing of a timing gap command will cause a break in the PC decoding process until the next sync point.

The PC trace gap code indicates that some PC trace information is missing at this point. This could occur for a number of reasons, such as:

The trace queues in the target processor have overflowed before all of the data was transmitted.

A trace sync point was about to get an entire ID value (0-7) behind another sync points.

A trace stream was about to send data commands in an order that violated the predefined rules. This should be prevented by the encoding hardware.

The next PC trace information is a PC Synchronization code and the PC trace remains invalid until the Synchronization code is found in the PC trace stream. The PC Trace Gap code can only be issued at the natural boundary between two packets or packet sequences.

It is permissible to have PC syncs included in a gap thus introducing a discontinuity in the PC sync ID sequence.

SUMMARY OF THE INVENTION

A method is described to inject a 'data gap' marker into the trace stream with an accompanied count value that would indicate how much data was lost. In a system that generates multiple trace streams (e.g. timing, PC, data, event), each stream could have a marker with each including information specific to the context of that stream. For instance, a gap on a data trace stream would include information about how many transactions were lost. A gap on a timing stream would include information on how many cycles were lost. A gap on a PC stream would include information on how many discontinuities were lost. A gap on an event trace stream would include information about how many events or event windows were lost.

In addition to including information communicating the amount of data that may be lost, a throttling mechanism may be created to control the amount of trace data. Throttling may be implemented in a number of ways, two of which are shown:

Dead-Window Throttle—A dead window, the duration of which is user programmable, is opened when an internal FIFO reaches a certain threshold. While the window is open, any data transaction that would normally be forwarded to the trace encoding logic is blocked and a data gap is inserted in its place. The dead window expires once the user programmable duration expires.

Real-Time Throttle—In real time throttling, the utilization of the trace bus is monitored constantly. When the utilization exceeds a user defined threshold, the data trace is either blocked completely (data gap messages would be inserted in their place), or throttled using another technique such as the dead-window throttle. When utilization is less than or equal to the user-defined threshold, data trace operates normally.

BRIEF DESCRIPTION OF THE DRAWINGS

These and other aspects of this invention are illustrated in the drawings, in which.

DETAILED DESCRIPTION OF PREFERRED EMBODIMENTS

A debug trace source has the ability to generate a large amount of data. In some cases, the amount of data that needs to be generated will exceed the bandwidth that is available at the time.

Internal FIFOs can be instantiated to help store transaction information while it is waiting to be encoded and dispatched. Filtering and triggering capabilities can be implemented to allow the user to better refine the rules for which a transfer should be traced. Regardless of either of these, there is a high risk that the trace hardware will be asked to trace something that can't be done due to bandwidth limitations. This will ultimately result in the loss of trace data that the user may be unaware of. In existing trace solutions implemented by Texas Instruments, encountering a scenario where data trace can't be encoded due to bandwidth restrictions results in a special marker being injected into the trace stream at the next available slot to indicate that a 'data gap' has occurred. What's lacking is information related to how big the gap was—or how much data was lost.

Figure 1:
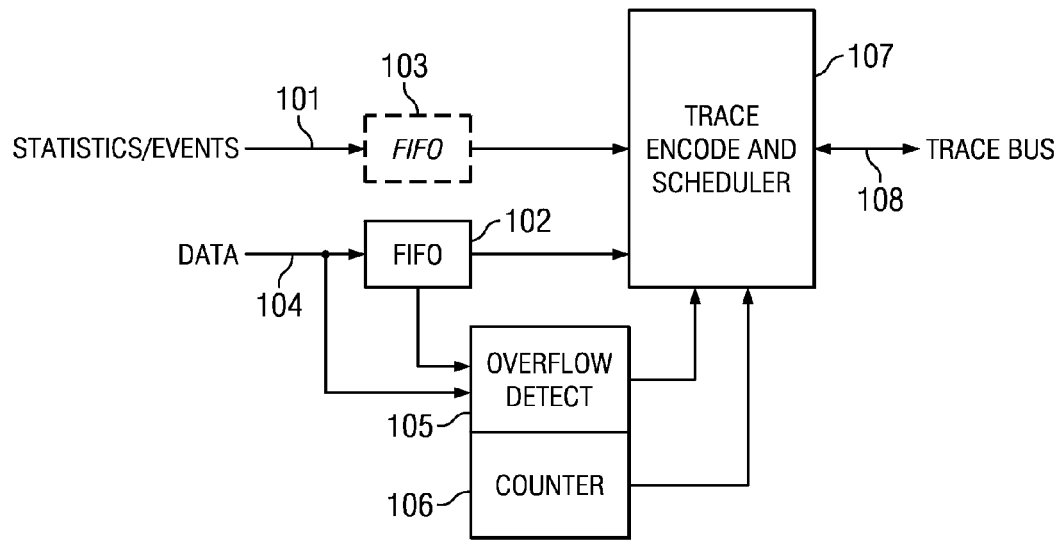
FIG. 1 is a block diagram showing one embodiment of the invention.

In one embodiment of the invention shown in FIG. 1 a 'data gap' marker is injected into the trace stream with an accompanied count value that would indicate how much data was lost. In a system that generates multiple trace streams (e.g. timing, PC, load or store addresses, data, event), each stream may have a marker with each including information specific to the context of that stream. For instance, a gap on a data trace stream would include information about how many transactions were lost. A gap on a timing stream would include information on how many cycles were lost. A gap on a PC stream would include information on how many discontinuities were lost. A gap on an event trace stream would include information about how many events or event windows were lost.

As shown in FIG. 1, statistics and various events of interest are input on line 101 to optional FIFO 103, and trace data is input on line 104 to FIFO 102. Both FIFOs 103 and 102 are connected to trace encoder and scheduler 107, with both the incoming data stream 104 and the internal state of FIFO 102 also connected to overflow detect block 105. When an overflow is detected by block 105, the excess data is counted by counter block 106, with both the resulting count and overflow status being communicated to trace encoder and scheduler 107.

Block 107 formats the trace stream, and outputs the results to trace buss 108. In the case of an overflow, as indicated by block 105 a trace gap is generated communicating the amount of missing data.

Tracing the properties of a data transfer (master id, target address, data value) results in a large amount of data that does not compress well being presented at once to the trace encoding hardware. This coupled with the existing filtering and triggering capabilities results in a design that has a high risk of either gapping (dropping trace data because of insufficient bandwidth) or not gapping and consuming excessive amounts of bandwidth on the trace bus.

At the System on Chip (SoC) level, the trace bus is routed through a trace interconnect to one or more endpoints referred to as Trace Sinks. Within the trace interconnect there may be points of constriction resulting from the merging of multiple trace streams or crossing into a clock-domain operating at a lower frequency. Such constriction points result in problem areas for trace sources that require large amounts of bandwidth.

Existing trace sources rely heavily on embedded triggering capabilities that monitor key busses to determine a window or point that needs to be traced, essentially filtering the data as it comes in to limit what is ultimately intended for the trace encode and scheduling logic. In the event this logic can't keep up with the request, gapping messages are generated to indicate that trace information has been lost. At the SoC level there may be a prioritization of trace streams at constriction points in the trace interconnect, or the trace stream may be filtered out all together on its way to a given trace sync. What is missing is the ability to keep data from being sent to the trace encode and scheduling logic based on temporal knowledge (only allow n-transactions over a time span of m-clocks, or only allow 1-transaction to be traced every m-clocks) and the ability to use real-time throughput statistics to prevent data from being encoded in an effort to reduce the amount of bandwidth consumed by the trace bus.

Figure 2:
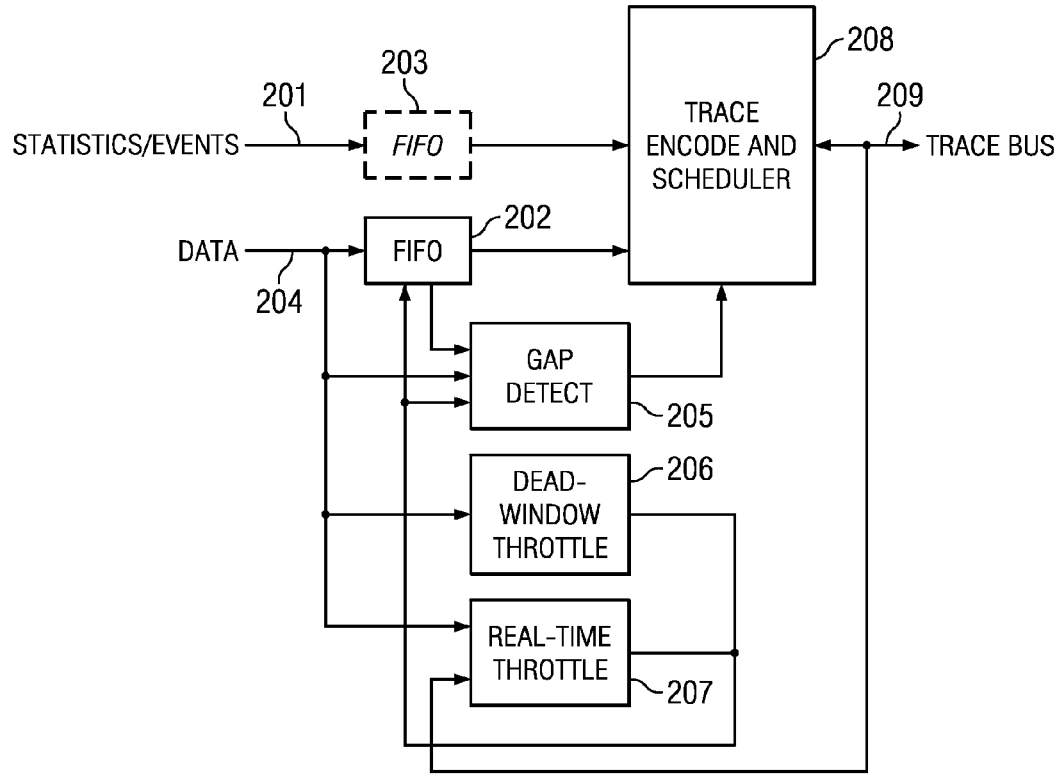
FIG. 2 shows a second embodiment incorporating the throttling functions.

In an other embodiment of the invention shown in FIG. 2 a throttling mechanism is created to control the amount of trace data. While other throttling mechanisms are possible, FIG. 2 demonstrates the following two:

Dead-Window Throttle: A dead window, the duration of which is user programmable, is opened when an internal FIFO reaches a certain threshold or when a single transaction occurs. While the window is open, any data transaction that would normally be forwarded to the trace encoding logic is blocked and a data gap is inserted in its place. The dead window expires once the user programmable duration expires.

Real-Time Throttle: In real time throttling, the utilization of the trace bus is monitored constantly. When the utilization exceeds a user-defined threshold, data trace is either blocked completely (data gap messages would be inserted in their place), or throttled using another technique such as the dead-window throttle. When utilization is less than or equal to the user-defined threshold, data trace operates normally.

As shown in FIG. 2, statistics and various events of interest are input on line 201 to optional FIFO 203, and trace data is input on line 204 to FIFO 202. Both FIFOs 203 and 202 are connected to trace encoder and scheduler 208, with both the incoming data stream 204 and the internal state of FIFO 202 also connected to gap detect block 205, the output of which is connected to trace encoder and scheduler 208.

Input data 204 also connects to dead window throttle 206 and real time throttle 207, with trace bus 209 also connecting to real time throttle 207.

The outputs from dead window throttle 206 and real time throttle 207 connect to gap detect block 205 signaling a throttling requirement, and also to FIFO 202 to control data input to trace encoder and scheduler 208. The dead window and the real time throttles may be utilized independently or together.

What is claimed is:

1. A method of controlling the amount of data generated by a debug trace comprising the steps of:
   buffering the generated trace data in a First In, First Out (FIFO) memory;
   monitoring the FIFO full signal;
   counting and then discarding the incoming data while the FIFO is full;
   inserting a data gap marker into the trace data where the data gap marker contains the accumulated count value indicating the amount of data that was lost.

2. The method of claim 1 wherein:
   there are multiple trace data streams.

3. The method of claim 2 wherein:
   the gap in a data trace stream includes information on the number of lost transactions.

4. The method of claim 2 wherein:
   the gap in a data trace stream includes information on how many processor cycles were lost.

5. The method of claim 2 wherein:
   the gap in a data trace stream includes information on how many discontinuities were lost.

6. The method of claim 2 wherein:
   the gap in a data trace stream includes information on how many events or event windows were lost.

7. A method of controlling the amount of data generated by a debug trace comprising the steps of:
   buffering the generated trace data in a First In, First Out (FIFO) memory;
   monitoring the FIFO data pointer signal;
   opening a dead window when the trace data buffered in the FIFO reaches a preprogrammed threshold;
   discarding incoming trace data while the dead window is open and inserting trace gap marker in the data trace indicating an amount of data that was lost; and
   closing the dead window upon expiration of a programmable time interval.

8. A method of controlling the amount of data generated by a debug trace comprising the steps of:
   monitoring the utilization of the data trace bus;
   discarding incoming trace data when the trace bus utilization exceeds a programmable threshold; and
   inserting a data gap message into the trace data stream indicating an amount of data that was lost.

9. A method of controlling the amount of data generated by a debug trace comprising the steps of:
   monitoring the utilization of the trace data bus;
   opening a dead window when the trace bus utilization reaches a preprogrammed threshold;
   discarding incoming trace data while the dead window is open and inserting a trace gap marker in the data trace indicating an amount of data that was lost; and
   closing the dead window when the trace bus utilization is equal to or less than the preprogrammed threshold.

* * * * *